(12) United States Patent
Prokop

(10) Patent No.: US 9,001,818 B2
(45) Date of Patent: *Apr. 7, 2015

(54) METHOD TO PROCESS A CALL REQUEST

(71) Applicant: Bockstar Technologies LLC, Wilmington, DE (US)

(72) Inventor: Andrew J. Prokop, St. Paul, MN (US)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,759

(22) Filed: Jan. 14, 2013

(65) Prior Publication Data

US 2013/0128878 A1 May 23, 2013

Related U.S. Application Data

(63) Continuation of application No. 10/980,095, filed on Nov. 3, 2004, now Pat. No. 8,355,393, which is a continuation of application No. 09/589,326, filed on Jun. 7, 2000, now Pat. No. 6,870,848.

(51) Int. Cl.
*H04L 12/28* (2006.01)
*H04L 29/06* (2006.01)

(52) U.S. Cl.
CPC ...... *H04L 65/1069* (2013.01); *H04L 29/06027* (2013.01); *H04L 12/28* (2013.01); *H04L 65/1006* (2013.01)

(58) Field of Classification Search
CPC ............................ H04L 12/2854; H04L 47/33
USPC ............. 370/351, 352, 389, 395.3, 401, 410, 370/420; 709/227, 230, 231, 237, 238, 245, 709/249
See application file for complete search history.

(56) References Cited

U.S. PATENT DOCUMENTS 5,206,903 A    4/1993  Kohler et al.
6,038,293 A    3/2000  McNerney et al.
(Continued)

OTHER PUBLICATIONS

Author Unknown, "Comparison of H.323 and SIP", Columbia University, Updated on Feb. 3, 2000, Accessed on Feb. 3, 2000, http://www.cs.columbia.edu/~hgs/sip/h323-comparison.html, 5 pages.
(Continued)

*Primary Examiner* — Dmitry H Levitan
(74) *Attorney, Agent, or Firm* — Withrow & Terranova, PLLC

(57) ABSTRACT

Establishing a communication session in a packet-based network. A communication session request is received from an originating device. The communication session request includes a destination address. A communication session is established with the originating device. The communication session includes a communication session identifier. Based on the destination address, a first media path is set up between the originating device and a first destination device, the first media path not including a communication session controller. The first media path between the originating device and the first destination device is taken down while maintaining the communication session with the originating device. After taking down the first media path, a second media path in the communication session is set up using the communication session identifier. The second media path extends between the originating device and a second destination device, the second media path not including the communication session controller.

21 Claims, 4 Drawing Sheets

(56) References Cited

U.S. PATENT DOCUMENTS

| | | | |
|---|---|---|---|
| 6,144,671 A * | 11/2000 | Perinpanathan et al. | 370/409 |
| 6,233,332 B1 | 5/2001 | Anderson et al. | |
| 6,366,577 B1 | 4/2002 | Donovan | |
| 6,404,746 B1 | 6/2002 | Cave et al. | |
| 6,430,176 B1 | 8/2002 | Christie, IV | |
| 6,445,695 B1 | 9/2002 | Christie, IV | |
| 6,446,127 B1 | 9/2002 | Schuster et al. | |
| 6,512,818 B1 | 1/2003 | Donovan et al. | |
| 6,567,398 B1 | 5/2003 | Aravamudan et al. | |
| 6,577,622 B1 | 6/2003 | Schuster et al. | |
| 6,625,141 B1 | 9/2003 | Glitho et al. | |
| 6,636,596 B1 * | 10/2003 | Gallant et al. | 379/220.01 |
| 6,826,194 B1 | 11/2004 | Vered et al. | |
| 6,829,236 B1 | 12/2004 | Archer | |

OTHER PUBLICATIONS

Crowcroft, Joe, "Comments About H.323 and SIP", Columbia University, Accessed on Mar. 3, 2000, http://www.cs.columbia.edu/~hgs/sip/h323.html, 6 pages.

Deering, S., et al., "Internet Protocol, Version 6 (IPv6) Specifications", Network Working Group—Request for Comments: 2460 Internet Engineering Task Force, Dec. 1998, 18 pages.

Donovan, Steve et al., "The SIP INFO Model", Internet Engineering Task Force Internet Draft, Jun. 1999, 4 pages.

Donovan, Steve, "The SIP Info Model", Internet Engineering Task Force Internet Draft, Feb. 2000, 5 pages.

Handley, M., et al., "SDP: Session Description Protocol", Network Working Groups: Request for Comments: 2327 Internet Engineering Task Force, Apr. 1998, 20 pages.

Handley, M., et al., "SIP: Session Initiation Protocol", Network Working Groups: Request for Comments: 2543 Internet Engineering Task Force, Mar. 1999, 153 pages.

Postel, J. (ed), "Internet Protocol: DARPA Internet Program Protocol Specification", Information Sciences Institute, Request for Comments (RFC) 791, Sep. 1981, 24 pages.

Kuthan, Jiri, "Sample Uses of SIP Info with Varying Reliability Needs", Internet Engineering Task Force Internet Draft, Accessed on Jan. 20, 2000, http://search.ietf.org/internet-drafts/draft-kuthan-sip-infopayload-00.txt, 7 pages.

Petrack, Scott et al., "The PINT Service Protocol: Extensions to SIP and SDP for IP Access to Telephone Call Services", Internet Engineering Task Force: PINT Working Group, Oct. 14, 1999, 30 pages.

Postel, J., "User Datagram Protocol", Request for Comments (RFC) 768 Internet Engineering Task Force, Aug. 1980, 2 pages.

Roach, Adam, "Event Notification in SIP", Internet Engineering Task Force Internet Draft, Mar. 2000, http://tools.ietf.org/id/draft-roach-sup-subscribe-notify-oo.txt 7 pages.

Rosenberg, J., et al., "Reliability of Provisional Responses in SIP", Internet Engineering Task Force Internet Draft, May 20, 1999, http://www.softarmor.com/sipwg/drafts/draft-ietf-mmusic-sip-100rel-01.txt, 12 pages.

Schulzrinne, H., et al., "RTP: A Transport Protocol for Real-Time Applications", Network Working Group—Request for Comments:1889, Jan. 1996, 35 pages.

Sparks, Robert et al., "SIP Telephony Service Examples with Call Flows", Internet Engineering Task Force Internet Draft, Oct. 1999, http://search.ietf.org/internet-drafts/draft-sparks-sip-service-examples-00.txt, 79 pages.

Non-Final Office Action for U.S. Appl. No. 09/589,326, mailed Oct. 21, 2003, 8 pages.

Final Office Action for U.S. Appl. No. 09/589,326, mailed May 3, 2004, 10 pages.

Notice of Allowance for U.S. Appl. No. 09/589,326, mailed Nov. 5, 2004, 6 pages.

Non-Final Office Action for U.S. Appl. No. 10/980,095, mailed Jan. 7, 2008, 10 pages.

Final Office Action for U.S. Appl. No. 10/980,095, mailed Jun. 9, 2008, 11 pages.

Non-Final Office Action for U.S. Appl. No. 10/980,095, mailed May 4, 2012, 7 pages.

Notice of Allowance for U.S. Appl. No. 10/980,095, mailed Sep. 12, 2012, 5 pages.

Braden, R., et al., "Resource ReSerVation Protocol (RSVP)—Version 1 Functional Specification," Network Working Group, Request for Comments: 2205, Sep. 1997, http://ftp.isi.edu/in-notes/rfc2205.txt, 102 pages.

Bray, Tim, et al., eds., "Extensible Markup Language (XML) 1.0" REC-xml-19980210, W3C, Feb. 10, 1998, 36 pages.

Handley, M., et al., "Session Announcement Protocol," Network Working Group, Request for Comments: 2974, Oct. 2000, https://www.ietf.org/rfc/rfc2974.txt, 17 pages.

Postel, Jon, ed., "Transmission Control Protocol: DARPA Internet Program Protocol Specification," Information Sciences Institute, Request for Comments (RFC): 793, Sep. 1981, 89 pages.

Schulzrinne, H., et al., "Real Time Streaming Protocol (RTSP)," Network Working Group, Request for Comments: 2326, Apr. 1998, 92 pages.

Examiner's Answer for U.S. Appl. No. 10/980,095, mailed Feb. 4, 2009, 11 pages.

Decision on Appeal for U.S. Appl. No. 10/980,095, mailed Nov. 9, 2011, 9 pages.

* cited by examiner

METHOD TO PROCESS A CALL REQUEST

CROSS-REFERENCE TO RELATED APPLICATIONS

This is a continuation of U.S. application Ser. No. 10/980,095, filed Nov. 3, 2004, which is a continuation of U.S. application Ser. No. 09/589,326, filed Jun. 7, 2000, now U.S. Pat. No. 6,870,848, the disclosures of which are hereby incorporated herein by reference in their entireties.

BACKGROUND

The invention relates to a method and apparatus for call processing.

Packet-based data networks are widely used to link various types of network elements, such as personal computers, servers, gateways, network telephones, and so forth. Data networks may include private networks (such as local area networks or wide area networks) and public networks (such as the Internet). Popular forms of communications between network elements across packet-based data networks include electronic mail, file transfer, web browsing, and other exchanges of digital data.

With the increased capacity and reliability of packet-based data networks, voice communications (including telephone calls, video conferencing, and so forth) over data networks have become possible. Voice communications over data networks are unlike voice communications in a conventional public switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data sent over a data network typically shares network bandwidth with conventional non-voice data (e.g., data associated with electronic mail, file transfer, web access, and other traffic).

Various standards have been proposed for voice and multimedia communications over data networks. One such standard is the H.323 Recommendation from the International Telecommunications Union (ITU), which describes terminals, equipment, and services for multimedia communications over data networks. Another standard for voice and multimedia communications is the Session Initiation Protocol (SIP), which establishes, maintains, and terminates multimedia sessions over a data network. SIP is part of multimedia data and control architecture developed by the Internet Engineering Task Force (IETF). The IETF multimedia data and control architecture also includes other protocols to enable voice and multimedia sessions over data networks.

To establish a call, an originator device sends a call request to a destination device, with the call request containing an identifier of the destination device. The identifier may be a telephone number, a SIP address, or some other identifier. In a network having multiple network elements capable of participating in a voice or multimedia session, each network element is typically assigned a unique identifier. In a SIP network, one or more SIP proxies may be used to resolve locations of devices associated with a logical identifier. Thus, for example, a call request containing a telephone number may be processed by the SIP proxy, with the telephone number resolved to the physical location of the destination device.

Although improved technology has enhanced the flexibility in how a call session is established, some limitations still exist. For example, in a conventional network, convenient mechanisms have not been provided to enable a group of network elements to be associated with a single or a reduced number of logical identifiers for call sessions over packet-based networks. A need thus exists for a method and apparatus to enable more flexible techniques and mechanisms for call processing over packet-based data networks.

SUMMARY

In general, according to one embodiment, a method of providing call processing in a communications system having a packet-based network comprises receiving a first call request from a first device and sending a response to the first call request to indicate an attempt to establish a call session. One of plural destination devices to contact is identified in response to the first call request, and a second call request is sent to the one destination device.

In general, according to another embodiment, a system capable of participating in call sessions over a packet-based network includes a first module adapted to process a first call request from a first device in a server mode and a second module adapted to send a second call request to a second device in a client mode in response to the first call request. Further, a third module is adapted to process at least one message from one of the first and second devices in a proxy mode.

Some embodiments of the invention may have one or more of the following advantages. Increased capabilities are provided for management of inbound calls targeted to a community of network entities. Decisions may be made on which of plural entities are accessed in response to a given inbound call or in response to input data received during a call. In one example application, a single or a small number of telephone numbers may be presented to the outside world while, within the community, multiple parties (greater than the number of telephone numbers presented to the outside world) are present that can take the inbound call. By combining tasks performed by various logical entities (e.g., client, server, proxy) for call processing in a packet-based network, flexibility may be enhanced.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to a Session Initiation Protocol (SIP) in the described embodiments, other embodiments may include other protocols for real-time interactive call sessions.

Figure 1:
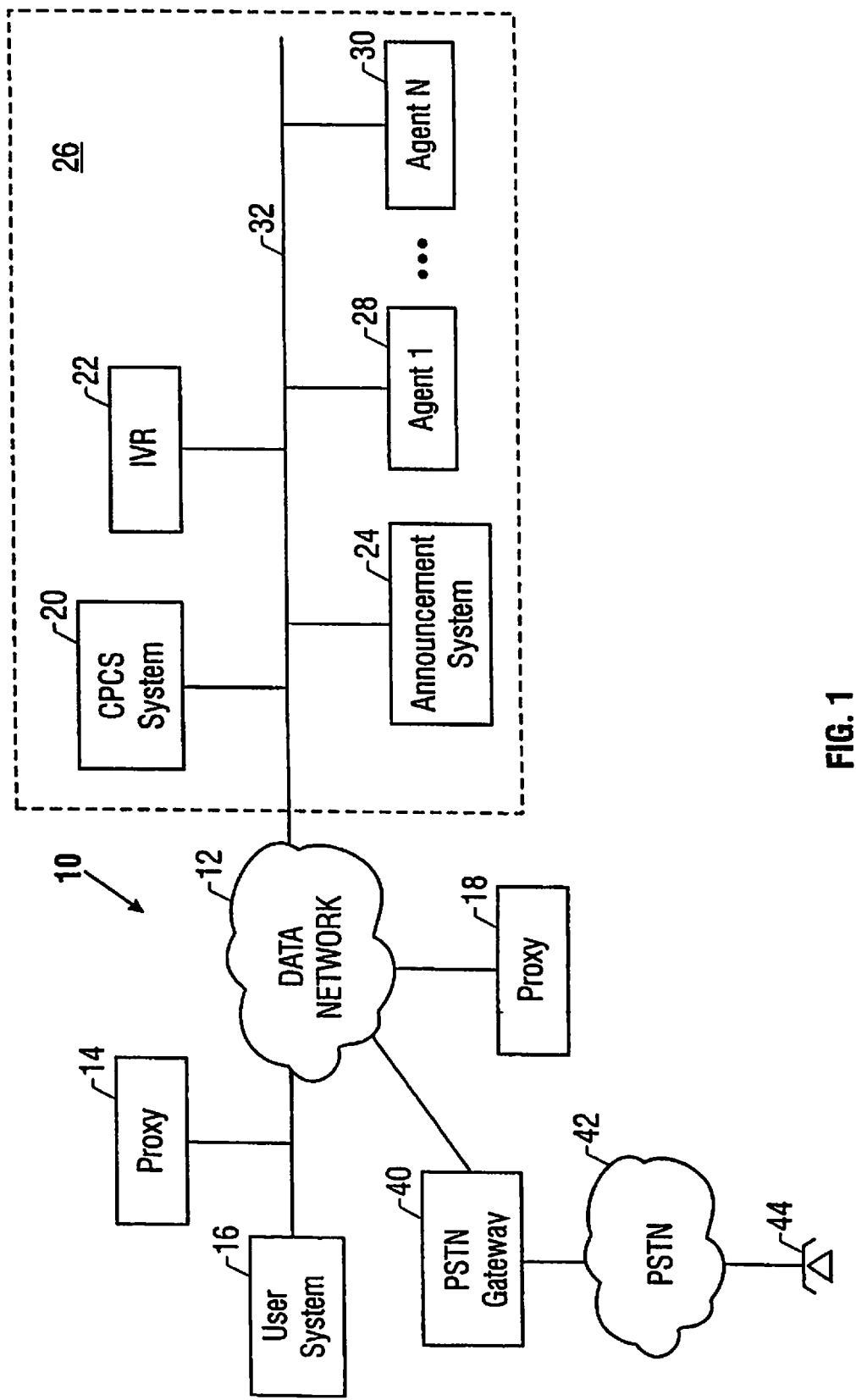
FIG. 1 is a block diagram of an embodiment of a communications system including a packet-based network.

Referring to FIG. 1, a communications system 10 includes a packet-based data network 12 and various network elements. The network elements may include a user system 16 and proxies 14 and 18, as well as various network elements in a community 26. As used here, a "community" may refer to any collection or group of systems or devices that may be grouped together. For example, the community 26 may include an enterprise, such as a corporation or other organization.

The community 26 contains a call processing control (CPC) system 20 in accordance with an embodiment that includes combined logical entities. Such logical entities may include a client task, a server task, and a proxy task. Under control of the client, server, and proxy tasks, the CPC system 20 is capable of processing inbound calls over the data network 12 and routing the calls to appropriate ones of various network elements (in the community 26) that may be coupled to a local network 32, which may be a packet-based network. As examples, the network elements include an IVR (integrated voice response) system 22 to provide integrated voice services, an announcement system 24, and various systems 28, 30 associated with plural agents. Agents may be persons associated with a customer service department, technical support personnel, and so forth, as examples. Other network elements may also be connected to the local network 32.

One capability provided by the CPC system 20 is the ability to present one or a relatively small number of telephone numbers or other identifiers to the outside world (outside the community 26). A call originated from an outside network element and directed to a telephone number or address associated with the community 26 is processed by the CPC system 20. The CPC system 20 accepts the call and determines, based on information in the call request or further input or information from the calling entity, which of the network elements in the community 26 is to be involved in the call session. In effect, the CPC system 20 is able to perform one-to-many address or identifier translation of an address or identifier contained in an inbound call request. In addition, in an established same call session, the CPC system 20 can direct a call from a first device in the community 26 to another device in the community.

Any one of the network elements in the community 26 may place an outgoing call through the CPC system 20. A called party on the outside world may receive an indication that the originator is the community 26 rather than one of the individual agents 28, 30. The CPC system 20 thus provides a combination of tasks: a server to accept a call from a client; a proxy to process a call on behalf of another network element; and a client to initiate a call to a destination device inside or outside the community 26.

As used here, a "call session" refers generally to either an audio (e.g., voice), a video, or a multimedia session established between two or more network elements (and parties using those elements) coupled to the data network 12 (or any other data network). A call session may also be a text-based chat session, such as an instant massaging session. As used here, an "interactive" call session refers to a call session in which two or more parties are involved in an exchange of voice and/or video data (or text data) in an established session between two or more network elements. A "real-time" interactive call session refers to an exchange of data, such as audio and/or video data (or text data), on a substantially real-time basis between two terminals. A session is substantially real time if interaction is occurring between two end points or parties, with a communication from one end point followed relatively quickly by a response or another communication from the other end point, typically within seconds, for example. A "call request" is a message (inbound or outbound) generated to establish a call session.

Interactive call sessions are contrasted with electronic mail messaging, for example, in which a first participant sends a message over a data network to a second participant. No indication is usually provided back to the first participant that the second participant has received the message or that the second participant is even at his or her terminal. In contrast, an interactive session involves a request followed by some acknowledgment that a called party has accepted the call request. This enables the interactive session in which participants exchange data (e.g., voice, video, and/or text).

As used here, a "data network" or "network" may refer to one or more communications networks, channels, links or paths, and systems or devices (such as routers) used to route data over such networks, channels, links, or paths. Packet-based data networks communicate with packets, datagrams, or other units of data over the data networks. Unlike circuit-switched networks, which provide a dedicated end-to-end connection or physical path for the duration of a call session, a packet-based network is one in which the same path may be shared by several network elements.

A packet-based network may be a packet-switched network, such as an Internet Protocol (IP) network, which is based on a connectionless internetwork layer. Packets or other units of data transmitted into a packet-switched data network may travel independently over any path (and possibly over different paths) to a destination point. The packets may even arrive out of order. Routing of the packets is based on one or more addresses carried in each packet.

One version of IP is described in the Request for Comments RFC 791, entitled "Internet Protocol," dated September 1981. Other versions of IP, such as IPv6, or other connectionless packet-switched standards may also be utilized in further embodiments. A version of IPv6 is described in RFC 2460, entitled "Internet Protocol, Version 6 (IPv6) Specification," dated December 1998.

Packet-based networks may also be connection-oriented networks, such as Asynchronous Transfer Mode (ATM) or Frame Relay networks. In a connection-oriented packet-based network, a virtual circuit or connection is established between two end points. In such connection-oriented networks, packets are received in the same order in which they were transmitted.

One protocol that provides for establishment of streaming communications includes a Session Initiation Protocol (SIP). SIP is part of the multimedia data and control architecture from the Internet Engineering Task Force (IETF). A version of SIP is described in RFC 2543, entitled "SIP: Session Initiation Protocol," dated 1999. SIP may be used to initiate call sessions as well to invite members to a session that may have been advertised by some other mechanism, such as electronic mail, newsgroups, web pages, and other mechanisms. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327; and the Session Announcement Protocol (SAP), for advertising multimedia sessions.

Other standards may be employed in further embodiments for controlling call sessions over the data network 12. Such other standards may be any other standard that provides for interactive, real-time streaming communications over the data network 12. One alternate standard is the H.323 Recommendation from the International Telecommunication Union (ITU).

In accordance with SIP, the various elements may be SIP clients, SIP servers, or SIP proxies. In the case of one embodiment of the CPC system 20, an entity having a combination of a SIP client, SIP server and SIP proxy may be provided. A SIP client system includes a client application program that is capable of sending SIP requests to perform call requests. A SIP server system includes a server application program that accepts SIP requests to serve as calls and to send back responses to SIP requests. Any user or subscriber system may be a SIP client system when making calls and a SIP server system when receiving calls. A SIP proxy system includes an intermediary program that acts as both a server and a client for making requests on behalf of other clients.

Thus, in the example of FIG. 1, the user system 16 and any one of the agent systems 28, 30 may be SIP client or SIP server systems. When establishing a call, a SIP client system may establish a call directly over the data network 12 with a server or destination system. Alternatively, the SIP client system may establish the call through one or more SIP proxies.

A call session over the data network 12 may also involve a terminal coupled to a traditional circuit-switched network, such as a public switched telephone network (PSTN) 42. The PSTN-connected device may be a standard telephone 44. Circuit-switched signaling and traffic are translated to packet-based signaling and traffic by a PSTN gateway 40. Thus, a user at the telephone 44 may dial the one or more telephone numbers associated with the community 26 to reach the CPC system 20. Similarly, any one of the network elements in the communications system 10 may direct a call targeted to the telephone 44.

Figure 2:
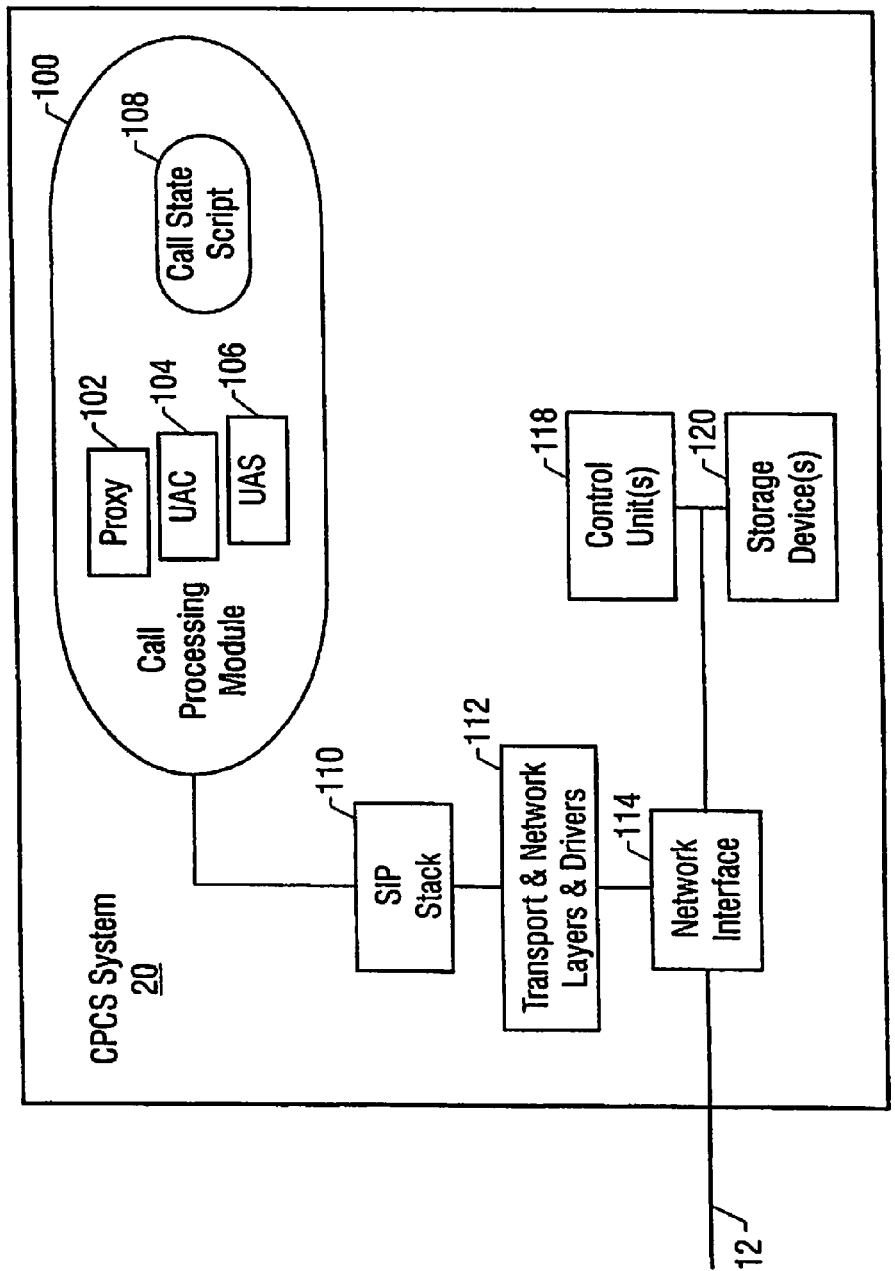
FIG. 2 is a block diagram of components of a call processing control (CPC) system in accordance with an embodiment usable in the communications system of FIG. 1, the CPC system providing combined server, client, and proxy modules.

Referring to FIG. 2, the components of the CPC system 20 in accordance with one embodiment are illustrated. The CPC system 20 includes a call processing module 100 that may include several elements, including a proxy module 102, a user agent client (UAC) module 104, and a user agent server (UAS) module 106. Although indicated as sub-modules within a general module, the proxy, UAC and UAS may actually be separate modules in the CPC system 20 in a further embodiment.

As used here, the client, server, and proxy modules may also be referred to as tasks. In addition, the CPC system 20 can be said to be operating in one of client, server, or proxy modes depending on which of the client, server, or proxy modules or tasks have control.

The call processing module 100 may also include a call state script 108 that determines what the call processing module 100 should do next in the establishment, management, or termination of a call session. In one embodiment, the call state script 108 may be implemented as an Extensible Markup Language (XML™) script. One version of XML™ is described in "Extensible Markup Language (XML™) 1.0," Worldwide Web Consortium (W3C) Recommendation, dated February 1998. XML™ allows one to define a customized markup language for many classes of documents. XML™ may be used to encode may different types of information, including the script modules as described herein for creating telephony services in accordance with some embodiments.

The CPC system 20 includes a network interface, which may be in the form of a network interface card or controller, coupled to the data network 12 and local network 32. Above the network interface 114 are device drivers and transport and network layers 112. The transport and network layers 112 may include a TCP/IP stack and/or a UDP/IP stack. TCP is described in RFC 793, entitled "Transmission Control Protocol," dated September 1981; and UDP is described in RFC 768, entitled, "User Datagram Protocol," dated August 1980. TCP and UDP are transport layers for managing connections between network elements over an IP network. For processing of SIP control messages, a SIP stack 110 is provided. The SIP stack 110 is basically a state machine to parse SIP messages.

The various software routines or modules in the CPC system 20 may be executable on one or more control units 118. Instructions of such software routines or modules may be stored in one or more storage devices 120 and loaded for execution on the one or more control units 118.

One example use of the CPC system 20 is in a call center, which may be the technical support department or customer service department of a company that has many agents answering calls. In the call center example, the community 26 is the call center. The call center may present a single or small number of telephone numbers or other call identifiers to the outside world. A customer calls one of these numbers or identifiers and is given some ringback indication or an announcement. The call center software, which may be the call processing module 100 of the CPC system 20, may connect the caller to a variety of destinations. For instance, a caller might be first connected to the IVR system 22 (FIG. 1) to collect input data from the customer. The collected data is then used to determine which agents may be able to meet the customer's needs. While an available agent is being chosen, the customer may be connected to a voice announcement system that informs the customer that he or she is being connected to an agent and an approximate wait time. When ready, the CPC system 20 connects the customer to an agent (28, 30). While the customer is speaking to the agent, the CPC system 20 may monitor the call.

When a call request is received by the CPC system 20, the CPC system 20 acts as if it is the end point of the call (providing the services of a UAS). Based on information contained in the call request or received from the calling entity, the CPC system 20 can establish a session with a selected entity in the community 26 (acting as a UAC in this capacity). The CPC system 20 is also able to route messages to an appropriate destination (which is the role of a SIP proxy). The CPC system 20 is a participant in both calls involved in a call session—the call from the caller to the CPC system 20 and the call from the CPC system 22 to a call center end point (a network element in the community 26). The CPC system 20 acts as a "stateful" proxy; that is, the CPC system 20 is involved in all calls from inception to release. However, although the control path is through the CPC 20, the media path may be between the appropriate one of the network elements in the community 26 and the caller.

Figure 3:
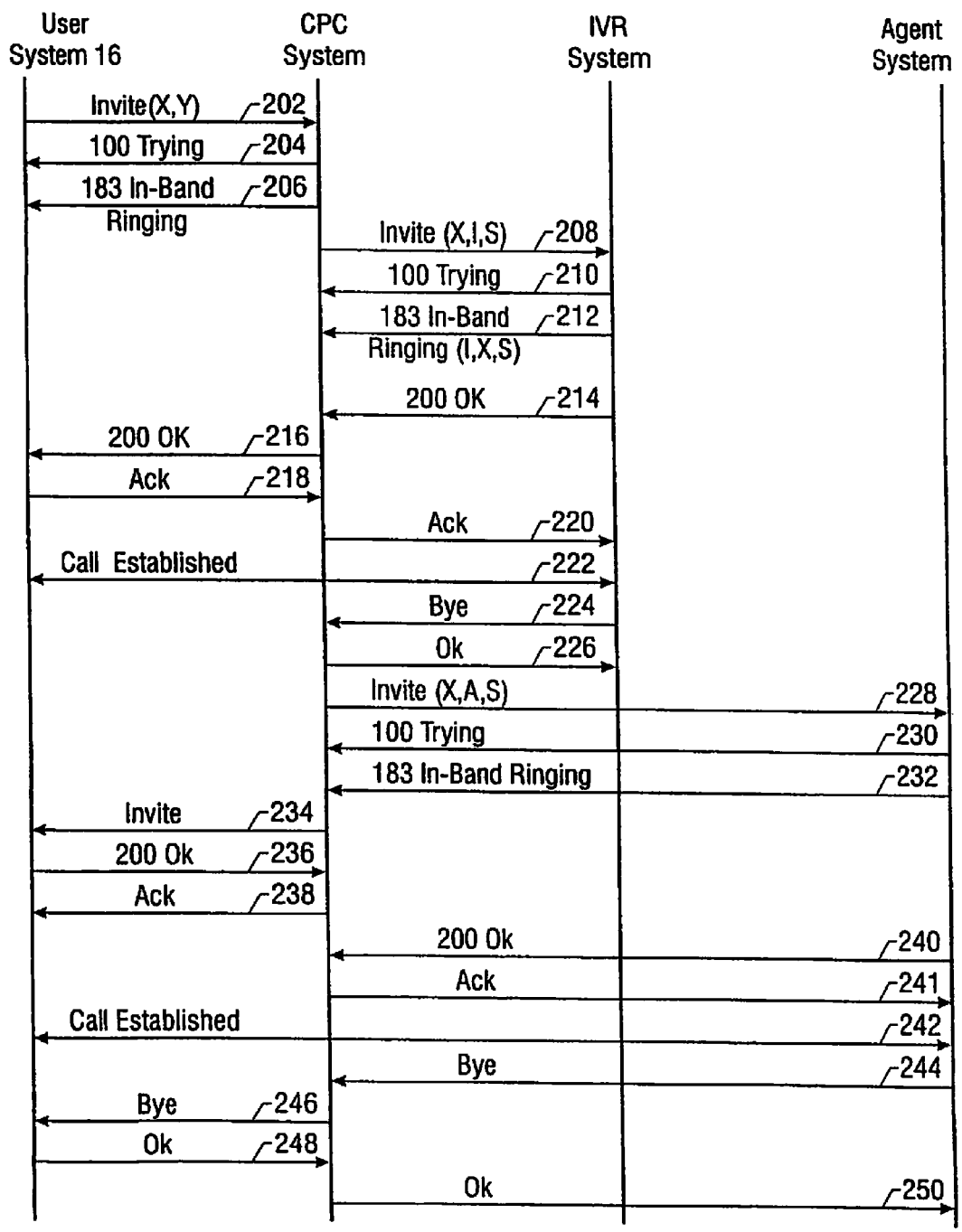
FIG. 3 is a message flow diagram of various states of a call session involving a user system and the CPC system in accordance with an embodiment.

Referring to FIG. 3, a message flow of an example call session is illustrated. A user system, which may be the user system 16, or the PSTN gateway 40 acting on behalf of a circuit-switched connected telephone, may send a SIP Invite request (at 202) to the CPC system 20. The SIP Invite request is a call request to invite a remote network element to a desired call session. The Invite request sent at 202 contains a callee identifier Y, which may be in one of numerous forms, such as a telephone number, a SIP address, or any other logical identifier. The identifier Y is an identifier associated with the community 26. The Invite request also contains an origination address X associated with the calling user system.

The CPC system 20 may return a Trying response (at 204), followed by a 183 In-Band Ringing response (at 206). The In-Band Ringing response indicates that the destination has been found and the receiving network element is attempting to reach the called party. In-Band Ringing allows the CPC system 20 to provide media to the caller, such as a ringback, a recorded announcement, and so forth prior to answering the call. As an alternative, instead of a 183 In-Band Ringing response, a 180 Ringing response may be sent by the CPC system 20. When the initiating user system receives the 183 Ringing message, it generates locally a ring indication.

By directly acknowledging the Invite request with the Trying and In-Band Ringing responses sent at 204 and 206, the CPC system 10 acts as a SIP server. Thus, generation and communication of the Trying and In-Band responses are controlled by the UAS 106 in the CPC system 20.

Next, in its client mode, the CPC system 20 (under control of the UAC 104) then sends an Invite request (at 208) to the IVR system. The Invite request sent at 208 includes an origination address X associated with the user system 16, a destination address I associated with the IVR system 22 (FIG. 1), and a via address S corresponding to the address of the CPC system 20. Upon receipt of the Invite request, the IVR system 22 returns a Trying response (at 210) followed by a 183 In-Band Ringing response (at 212). The Trying and Ringing responses are absorbed by the UAC 104. Once it has accepted the call, the IVR system 22 sends an OK response (at 214) to the UAC 104 in the call processing module 100. In response, under control of the proxy 102 in the call processing module 100, an OK response is sent (at 216) back to the user system 16 to indicate that the Invite request (sent at 202) has been accepted.

The OK response sent by the IVR system 22 contains a message body (in SDP format) that describes the capabilities of the IVR system 22. The message body is included in the OK response sent (at 216) to the user system 16. In response, the user system 16 sends an Ack request (at 218) back to the UAS 106 in the CPC system. The proxy 102 in the CPC system 20 forwards the Ack request (at 220) to the IVR system 22. At this point, a call has been established (at 222) between the user system 16 and the IVR system. The media path for the call 222 is between the user system and IVR system directly (without passing through the CPC system 20).

During the IVR call 222, the IVR system 22 may prompt the user to input requested information. The IVR system 22 can collect voice data, DTMF (dual tone multi-frequency) signals, or other types of input data. At the conclusion of the IVR call, after the IVR system has collected the desired user information (e.g., user name, account information, and so forth), the IVR call 222 may be released. This is accomplished by the transmission of a Bye request (at 224) from the IVR system 22 to the CPC system 20. The CPC system 20 returns an OK response (at 226) to indicate that the Bye request has been successfully processed. The IVR call 222 at this point has terminated. However, the call session involving the calling user system and the community 26 is not released. Instead, the CPC system 20 will attempt to establish another call in the call session between the user system and another entity in the community 26.

The CPC system 20 may then send (at 228) an Invite request to an appropriate agent system based on the collected customer information. For example, the customer may have bought a certain type of product which is handled by a predetermined department. The origination address in the Invite request at 228 is the address X of the user system 16, the destination address A corresponds to the agent system, and the via field is the address S corresponding to the CPC system 20 acting in its proxy capacity. Upon receipt of the Invite request, the agent system returns a Trying response (at 230) followed by a 183 In-Band Ringing response (at 232). While the CPC system 20 is re-connecting the call, it may play some pre-recorded message.

To re-connect the call session from the IVR system 22 to the agent system, the CPC system 20 sends an Invite request (at 234) to the user system 16 to redirect the media path to be between the user system 16 and the agent system (instead of the IVR system 22). The Invite request includes a message body that contains information describing the agent system. To indicate that this is part of the same call session with the call user system, the Invite request includes the same call ID with a higher call sequence number. The user system 16 returns an OK response (at 236) when it accepts the Invite request sent at 234. In response, the CPC system 20 sends an Ack request to the user system.

The agent system sends an OK response (at 240) back to the CPC system 20 to accept the Invite request sent at 228. A reliable response message scheme may be used to insure that the OK response sent at 240 is after the re-invite sequence performed at 234, 236 and 238. One example of a reliable response message scheme is described in IETF Internet Draft, entitled "Reliability of Provisional Responses in SIP," dated May 1999. Upon receipt of the OK response at 240, the CPC system 20 returns an Ack request (at 241) to establish a call (at 242) between the user system and the agent system.

To terminate the call, the agent system may send a Bye request (at 244) back to the CPC system 20. The CPC system 20, in its proxy capacity, then sends the Bye request (at 246) to the user system. The user system returns an OK response (at 248), with the CPC system 20 forwarding an OK response (at 250) to the agent system to acknowledge the Bye request sent at 246.

Figure 4:
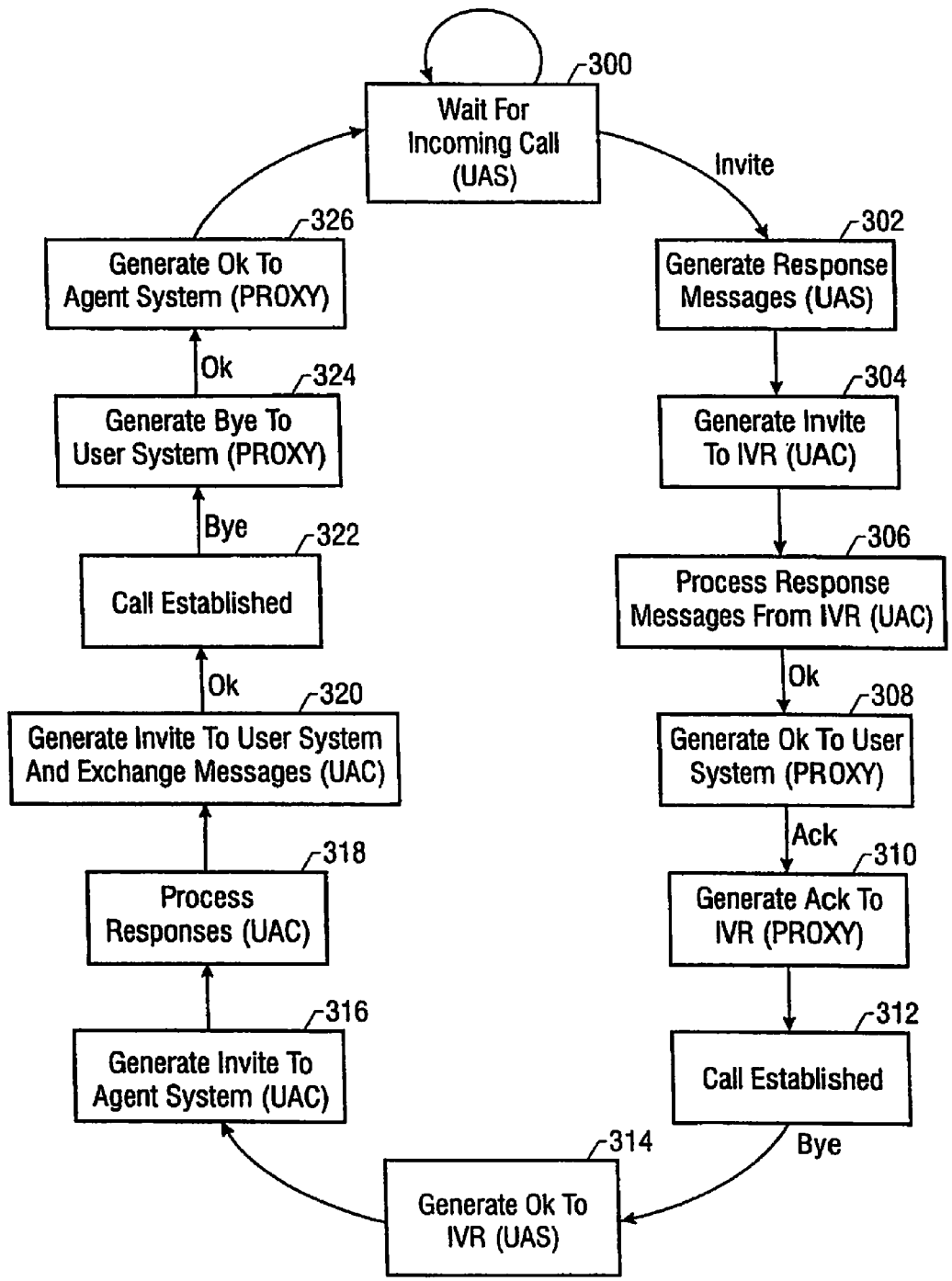
FIG. 4 is a state diagram of processing performed in the CPC system of FIG. 2.

Referring to FIG. 4, a state diagram represents processing of various messages performed by the call processing module 100 (FIG. 2). The state diagram of FIG. 4 tracks events occurring in the message flow diagram of FIG. 3. The UAS 106 in the call processing module 100 waits (at 300) for receipt of an incoming call request from a user system. When an Invite request is received, the UAS 106 generates (at 302) response messages to send back to the calling user system (204 and 206 in FIG. 3).

Next, the UAC 104 in the call processing module 100 generates (at 304) an Invite request to send to the IVR system 22 (208 in FIG. 3). The UAC 104 then processes (at 306) response messages received from the IVR system 22 (210 and 212 in FIG. 3). Upon receipt of an OK response (214 in FIG. 3) from the IVR system 22, the proxy 102 in the call processing module 100 generates an OK response (at 308) to send to the user system (216 in FIG. 3). When an Ack request is received (sent at 218 in FIG. 3), the proxy 102 generates an Ack request (at 310) to send to the IVR system 22 (220 in FIG. 3). At this point, a call has been established (at 312), with the media path set up between the user system and the IVR system 22.

When the call with the IVR system 22 is terminated by a Bye request from the WR system 22, the UAS 106 generates (at 314) an OK response to send to the IVR system 22 (226 in FIG. 3). The call processing module 100 then proceeds to re-connect the user system with another element in the community 26, which may be one of the agent systems. To do so, the UAC 104 generates an Invite request (at 316) to send to the agent system (228 in FIG. 3). The UAC 104 processes (at 318) response messages from the agent system (230 and 232 in FIG. 3). Next, the UAC 104 generates an Invite request (at 320) to send to the user system (234 in FIG. 3). The UAC 104 also exchanges messages with the user system and the agent system (236, 238, and 240 in FIG. 3) to establish the call between the user system and the agent system (at 322).

Upon receipt of a Bye request from the agent system to terminate the call session, the proxy 102 generates (at 324) a Bye request to send to the user system. Upon receipt of an OK response from the user system, the proxy 102 generates an OK response to the agent system to acknowledge the Bye request.

A system that combines several logical entities, including a client, server, and proxy, is used for processing calls and directing the calls to appropriate ones of plural destinations. Such destinations may be part of a predefined community, such as a call center. The community may be associated with a single or a relatively small number of identifiers, such as telephone numbers. When a caller from outside the community communicates a call request containing one of the identifiers associated with the community, the call processing system responds initially as if it was the intended destination. The call processing system then proceeds to gather data about the caller and to identify an appropriate one of the destinations within the community that should be connected to the user system. Once a connection is established, a media path provided directly between the user system and the appropriate one of the destinations within the community is established. By combining tasks performed by various logical entities for call processing, flexibility may be enhanced. The combined system allows internal management (within the community) of how inbound calls are processed and which destinations are accessed internally in response to a given inbound call. Thus, a single or a relatively small number of identifiers may be presented to the outside world while internally, multiple parties (greater than the number of identifiers presented to the outside world) are present.

The various software modules, routines, or other layers discussed herein may be executed on control units, such as one or more control units 118 shown in FIG. 2. Each control unit may include a microprocessor, a microcontroller, a processor card (including one or more microprocessors or microcontrollers), or other control or computing devices. The control unit may be coupled to one or more storage units, which may include one or more machine-readable storage media for storing data and instructions. As used here, a "controller" may refer to software, hardware, or a combination of both.

The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions that make up the various software routines, modules, or other layers may be stored in respective storage units. The instructions when executed by a respective control unit cause the corresponding node or element to perform programmed acts.

The instructions of the software routines or modules may be loaded or transported into the node or element in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

The invention claimed is:

1. A method of establishing a communication session in a packet-based network, the method comprising, in a communication session controller:
   receiving a communication session request from an originating device, the communication session request comprising a destination address;
   establishing a communication session with the originating device, the communication session including a communication session identifier;
   based on the destination address, setting up a first media path between the originating device and a first destination device, the first media path not including the communication session controller;
   taking down the first media path between the originating device and the first destination device while maintaining the communication session with the originating device; and
   after taking down the first media path, setting up a second media path in the communication session using the communication session identifier, the second media path extending between the originating device and a second destination device, the second media path not including the communication session controller.

2. The method of claim 1, wherein:
   setting up the first media path comprises sending a communication session request from the communication session controller to the first destination device; and
   setting up the second media path comprises sending a communication session request from the communication session controller to the second destination device without sending a communication session end message to the originating device.

3. The method of claim 1, comprising sending a communication session request response from the communication session controller to the originating device in response to receiving the communication session request from the originating device, the communication session request response indicating an attempt to establish a communication session.

4. The method of claim 3, comprising sending a communication session request from the communication session controller to the first destination device in response to receiving the communication session request from the originating device to initiate setting up of the first media path.

5. The method of claim 4, comprising:
   receiving messaging from the first destination device at the communication session controller; and
   taking down the first media path between the originating device and the first destination device while maintaining the communication session with the originating device in response to the received messaging.

6. The method of claim 5, comprising sending a communication session request from the communication session controller to the second destination device in response to the received messaging to initiate setting up of the second media path.

7. The method of claim 5, wherein the first destination device is a network server, the method comprising sending the messaging from the network server to the communication session controller to initiate taking down of the first media path.

8. The method of claim 1, comprising:
receiving at the communication session controller from the second destination device messaging requesting ending of the communication session; and
in response to the messaging received from the second destination device, sending messaging from the communication session controller to the originating device to signal ending of the communication session.

9. The method of claim 1, wherein establishing the communication session with the originating device comprises executing at least one Extensible Markup Language (XML) script.

10. The method of claim 1, wherein the communication session request comprises a Session Initiation Protocol (SIP) Invite message.

11. The method of claim 10, wherein the communication session controller responds to receipt of the SIP Invite message by sending a SIP Invite message to the first destination device to initiate setting up of the first media path.

12. The method of claim 11, wherein the communication session controller initiates setting up of the second media path by sending a SIP Invite message to the second destination device without first sending a SIP Bye message to the originating device.

13. The method of claim 10, comprising sending a SIP Trying message from the communication session controller to the originating device in response to receiving the communication session request to indicate an attempt to establish a communication session.

14. The method of claim 10, comprising:
receiving a SIP Bye message at the communication session controller from the first destination device; and
taking down the first media path between the originating device and the first destination device while maintaining the communication session with the originating device in response to the received SIP Bye message.

15. The method of claim 10, comprising:
receiving at the communication session controller from the second destination device a SIP Bye message; and
in response to the SIP Bye message received from the second destination device, sending a SIP Bye message from the communication session controller to the originating device to signal ending of the communication session.

16. The method of claim 1, wherein the communication session request from the originating device is received by the communication session controller via a proxy.

17. The method of claim 16, further comprising sending the communication session request from the proxy to the communication session controller.

18. The method of claim 1, wherein the first destination device is a network server.

19. The method of claim 18, wherein the network server comprises at least one of an Interactive Voice Response (IVR) server and an announcement system server.

20. The method of claim 1, wherein the communication session is an interactive session in which participants exchange data.

21. The method of claim 20, wherein the data exchanged by the participants comprises at least one of voice data, video data, and text data.

* * * * *